United States Patent
Zhao et al.

(10) Patent No.: US 8,603,287 B2
(45) Date of Patent: Dec. 10, 2013

(54) METHOD FOR MANUFACTURING ALIGNMENT FILMS OF LIQUID CRYSTAL DISPLAY PANEL

(75) Inventors: Guo Zhao, Shenzhen (CN); Chien-pang Lee, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 1 day.

(21) Appl. No.: 13/379,638

(22) PCT Filed: Nov. 18, 2011

(86) PCT No.: PCT/CN2011/082390
§ 371 (c)(1),
(2), (4) Date: Dec. 20, 2011

(87) PCT Pub. No.: WO2013/067718
PCT Pub. Date: May 16, 2013

(65) Prior Publication Data
US 2013/0120705 A1      May 16, 2013

(30) Foreign Application Priority Data

Nov. 11, 2011   (CN) .......................... 2011 1 0357666

(51) Int. Cl.
*B32B 37/12* (2006.01)
(52) U.S. Cl.
USPC ................... 156/272.2; 252/299.66; 349/123

(58) Field of Classification Search
USPC ............ 156/272, 272.2; 252/299.66; 349/123
See application file for complete search history.

(56) References Cited

U.S. PATENT DOCUMENTS

| 4,830,469 | A | * | 5/1989 | Breddels et al. ................ 349/71 |
| 5,275,903 | A | * | 1/1994 | Sundararajan et al. .... 430/108.2 |
| 8,114,567 | B2 | * | 2/2012 | Webster et al. ............ 430/270.1 |
| 8,355,110 | B2 | * | 1/2013 | Kim et al. ..................... 349/183 |
| 2009/0056853 | A1 | * | 3/2009 | Pai et al. ......................... 156/60 |

FOREIGN PATENT DOCUMENTS

WO      WO 2007124073 A2 *   11/2007

* cited by examiner

*Primary Examiner* — Richard Crispino
*Assistant Examiner* — Elizabeth Royston

(57) ABSTRACT

The present invention discloses a method for manufacturing alignment films for a liquid crystal display panel, characterized in that the method includes steps of: dripping liquid crystal mixture, which comprises liquid crystal molecules and liquid crystal alignment monomers, on a first substrate; gluing the first substrate and a second substrate together, irradiating the first substrate and the second substrate by a first UV ray and providing an electric field between the first substrate and the second substrate at the same time; and irradiating the first substrate and the second substrate by a second UV ray, and curing the first substrate and the second substrate at the same time to form the alignment films.

15 Claims, 2 Drawing Sheets

METHOD FOR MANUFACTURING ALIGNMENT FILMS OF LIQUID CRYSTAL DISPLAY PANEL

TECHNICAL FIELD OF THE INVENTION

The present invention relates to a technical field of liquid crystal manufacture, and more particularly, to a method for manufacturing alignment films of a liquid crystal display (LCD) panel.

BACKGROUND OF THE INVENTION

As the rapid growth of jumbo-size LCD panels and the continuous increase of the market demand for LCD (Liquid Crystal Display) televisions, there are higher requirements of processing technology and manufacture cost of LCD.

Taking an alignment film of the LCD as an example, the alignment film of the prior art is generally of a twisted nematic (TN) mode. Under the TN mode, a twisted angle of liquid crystal molecules in the LCD is 90 degree. The LCD of TN mode fails to satisfy consumers' requirement for the displaying quality of LCD due to limitations of a viewing angle and a contrast.

In a multi-domain vertical alignment (MVA) mode LCD, which has been developed in recent years, lumps are formed on a substrate with a predetermined angle, and an alignment film is further formed, so that liquid crystals are deflected to a certain angle and become static.

The formation of the alignment film having the lumps usually has to be realized by the following steps: the first step, performing irradiation; the second step, providing an electric field; the third step, performing irradiation; the fourth step, curing.

It is obvious from the above steps that at least four separate and individual implementing steps are required in the process of forming the alignment film. The process is complicated, and the efficiency is low. In addition, several platforms are required for the multiple steps, the cost is higher.

SUMMARY OF THE INVENTION

An objective of the present invention is to provide a method for manufacturing alignment films of an LCD panel so as to solve the technical problems of complicated process, low efficiency in the alignment film manufacturing process of the prior art, and furthermore to reduce the manufacturing cost.

In order to solve the above problems and achieve the above advantageous effects, the present invention provides the method for manufacturing alignment films of the LCD panel, the method comprises the following steps:

dripping a liquid crystal mixture, which contains liquid crystal molecules and liquid crystal alignment monomers, on a first substrate;

gluing the first substrate and a second substrate together while maintaining the first substrate and the second substrate misaligned with each other by a predetermined distance so as to expose alignment voltage applying contact points of the second substrate; radiating the first substrate and the second substrate by a first ultraviolet (UV) ray, and providing an electric field between the first substrate and the second substrate through the alignment voltage applying contact points at the same time; polymerization reaction of the liquid crystal alignment monomers occurs to form lumps on inner surfaces of the first substrate and the second substrate, respectively, under the irradiation of the first UV ray; and irradiating the first substrate and the second substrate by a second UV ray, and curing the first substrate and the second substrate at the same time, wherein the polymerization reaction of remaining liquid crystal alignment monomers occurs completely to form lumps under the irradiation of the second UV ray, the lumps on the inner surfaces of the first substrate and the second substrate constitute the alignment films and the liquid crystal molecules form a pretilt angle under an effect of the lumps.

In the method for manufacturing alignment films of the LCD panel of the present invention, the method further comprises the following steps before gluing the first substrate and the second substrate together:

coating sealants on the second substrate;

when gluing the first substrate and the second substrate together, make the sealants on the second substrate surround the liquid crystal mixture on the first substrate correspondingly.

In the method for manufacturing alignment films of the LCD panel of the present invention, a proportion of the liquid crystal alignment monomers in the liquid crystal mixture is 3~5%, and a melting point of the liquid crystal alignment monomers is 100~165° C.

In the method for manufacturing alignment films of the LCD panel of the present invention, a wavelength range of the first UV ray is 300~380 nm, and an illuminance of the first UV ray is 15~120 milliwatts per square millimeter.

In the method for manufacturing alignment films of the LCD panel of the present invention, a wavelength range of the second UV ray is 300~380 nm, and an illuminance of the second UV ray is 0.05~0.10 milliwatt per square centimeter.

In the method for manufacturing alignment films of the LCD panel of the present invention, a range of accumulated luminous flux sum of the first UV ray and the second UV ray is 20~25 joules per square centimeter.

In the method for manufacturing alignment films of the LCD panel of the present invention, a monomer molecule of the liquid crystal alignment monomers is represented by the following chemical formula:

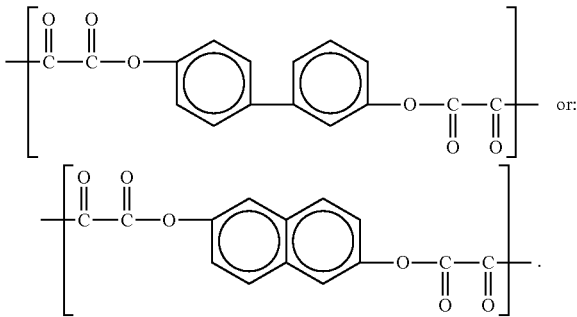

Another objective of the present invention is to provide a method for manufacturing alignment films of an LCD panel so as to solve the technical problems of complicated process, low efficiency in the alignment film manufacturing process of the prior art, and furthermore to reduce the manufacturing cost.

In order to solve the above problems and achieve the above advantageous effects, the present invention provides the method for manufacturing alignment films of the LCD panel, the method comprises the steps of:

dripping a liquid crystal mixture, which contains liquid crystal molecules and liquid crystal alignment monomers, on a first substrate;

gluing the first substrate and a second substrate together and executing radiation of a first ultraviolet (UV), as well as providing a uniform electric field between the first substrate and the second substrate at the same time; and irradiating the first substrate and the second substrate by a second UV ray, and curing the first substrate and the second substrate to form alignment films on the inner surfaces of the first substrate and the second substrate at the same time.

When irradiation of the first UV ray is executed, polymerization reaction of the liquid crystal alignment monomers occurs and lumps are formed on inner surfaces of the first substrate and the second substrate, respectively; and When irradiation of the second UV ray is executed, the polymerization reaction of remaining liquid crystal alignment monomers continues until a complete reaction is accomplished;

Amongst, the lumps constitute the alignment films, and the liquid crystal molecules form a pretilt angle under the effect of the lumps.

In the method for manufacturing alignment films of the LCD panel of the present invention, the method further comprises the following steps before gluing the first substrate and the second substrate together:

making the first substrate and the second substrate be misaligned with each other by a predetermined distance to expose alignment voltage applying contact points of the second substrate.

In the method for manufacturing alignment films of the LCD panel of the present invention, when the electric field is provided between the first substrate and the second substrate, the electric field is provided through the alignment voltage applying contact points.

In the method for manufacturing alignment films of the LCD panel of the present invention, the method further comprises the following steps before gluing the first substrate and the second substrate together:

coating sealants on the second substrate;

when gluing the first substrate and the second substrate, make the sealants on the second substrate surround the liquid crystal mixture on the first substrate correspondingly.

In the method for manufacturing alignment films of the LCD panel of the present invention, a proportion of the liquid crystal alignment monomers in the liquid crystal mixture is 3~5%, and a melting point of the liquid crystal alignment monomers is 100~465° C.

In the method for manufacturing alignment films of the LCD panel of the present invention, a wavelength range of the first UV ray is 300~380 nm (e.g. 365, 352 or 313 nm), and an illuminance of the first UV ray is 15~120 milliwatt per square millimeter, for example, 70~120 milliwatt per square millimeter or 1525 milliwatt per square millimeter.

In the method for manufacturing alignment films of the LCD panel of the present invention, a wavelength range of the second UV ray is 300~380 nm, and an illuminance of the second UV ray is 0.05~0.10 milliwatt per square centimeter.

In the method for manufacturing alignment films of the LCD panel of the present invention, a range of accumulated luminous flux sum of the first UV ray and the second UV ray is 20~25 joules per square centimeter.

In the method for manufacturing the alignment films of the LCD panel of the present invention, a monomer molecule of the liquid crystal alignment monomers is represented by the following chemical formula:

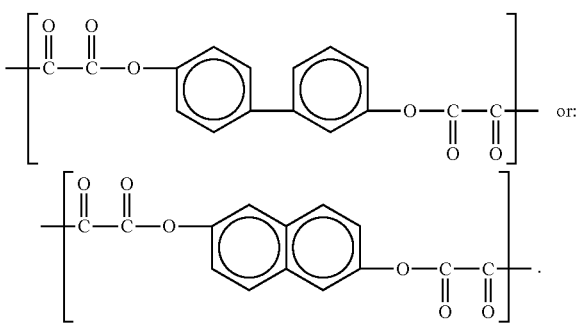

In contrast to the prior art, the present invention exposes the alignment voltage applying contact points of the second substrate when gluing the first substrate and the second substrate together, and provides the electric field through the exposed alignment voltage applying contact points when irradiating the first substrate and the second substrate by the first UV ray; in addition, the present invention further executes irradiation of the second UV ray and curing process to the first substrate and the second substrate, that is, the electric field is provided during irradiation of the first UV ray, and curing is executed during irradiation of the second UV ray. The processing flow for manufacturing the alignment films is extremely simplified by combining the steps, so the efficiency of alignment film manufacture is lifted. In addition, polymerization reaction of remaining liquid crystal alignment monomers continues until the complete reaction is accomplished to ensure that the liquid crystal alignment monomers are all used in alignment film manufacture. Further, since the procedure is simplified by the present invention, the number of the provided platforms is decreased as compared to the prior art, and therefore the cost of alignment film manufacture is reduced.

To make the forgoing contents of the present invention more manifest and understandable, preferred embodiments of the present invention will be described in detail in conjunction with the appending drawings as follows:

DETAILED DESCRIPTION OF THE INVENTION

Respective embodiments described in conjunction with the appending drawings as follows are specific embodiments of the present invention for exemplifying that the present invention is practicable.

Figure 1:
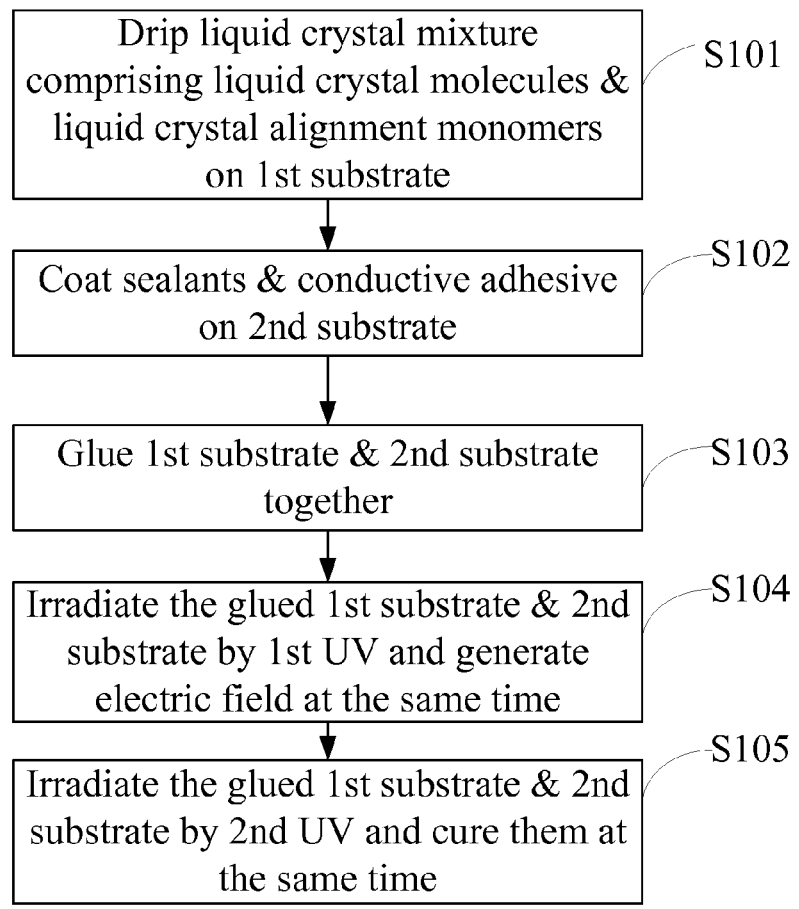
FIG. 1 is a schematic flow chart of a method for manufacturing alignment films of an LCD panel in accordance with the present invention.

Please refer to FIG. 1, which is a schematic flow chart of a method for manufacturing alignment films of an LCD panel in accordance with the present invention. Please also refer to FIGS. 2A-2C, which are schematic diagrams showing attachment configuration of the first substrate and the second substrate in the present invention.

In step S101, liquid crystal mixture is applied on a liquid crystal coating region 211 of a first substrate 21 by dripping, the liquid crystal mixture comprises liquid crystal molecules and liquid crystal alignment monomers.

In step S102, sealant and conductive adhesive are coated on a second substrate 22.

Amongst, a polymerization reaction of the liquid crystal alignment monomers provided in the present embodiment can proceed under a UV irradiation. In particular, under the UV irradiation, the polymerization reaction occurs in the liquid crystal alignment monomers, and polymers are then generated and attached to inner surfaces of the first substrate 21 and the second substrate 22, so that the inner surfaces of the first substrate 21 and the second substrate 22 have lumps of an order of nanometer formed thereon to serve as alignment films. Of course, in a practical implementation process, a complete polymerization reaction of all the liquid crystal alignment monomers is not easy to occur, the remaining liquid crystal alignment monomers will be further processed in a subsequent step of the present embodiment, and will be specifically described later.

Amongst, the sealants provided in the present embodiment are used to glue the first substrate 21 and the second substrate 22 together. The conductive adhesive provided in the present embodiment is used to conduct electrodes of the first substrate 21 with electrodes of the second substrate 22.

In a particular implementation process, a proportion of the liquid crystal alignment monomers is 0.2%~0.5%, a melting point of the liquid crystal alignment monomer is 100~165 Celsius degree (° C.). A monomer molecule of the liquid crystal alignment monomers is represented by the following chemical formula:

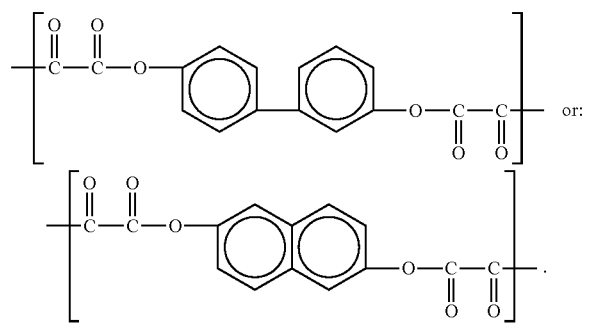

Figure 2A:
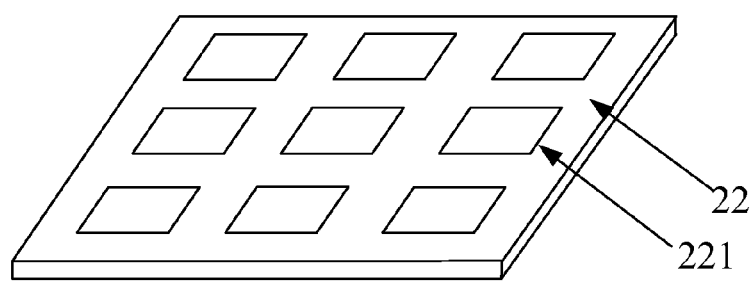
FIGS. 2A-2C are schematic diagrams showing attachment configuration of the first substrate and the second substrate in the present invention.
Figure 2B:
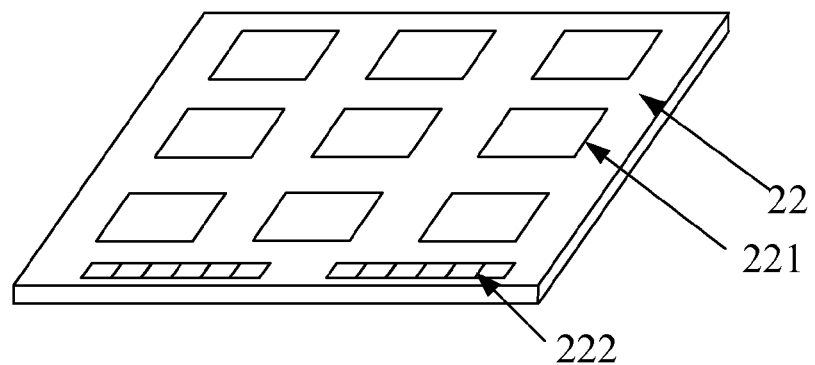

Please refer to FIG. 2B, sealants 221 are disposed on the second substrate 22, the positions of the sealants 221 are corresponding to the liquid crystal coating regions 211 of the first substrate 21. The second substrate 22 further has alignment voltage applying contact points 222 disposed at one end thereof.

In step S103, the first substrate 21 and the second substrate 22 are glued together.

Figure 2C:
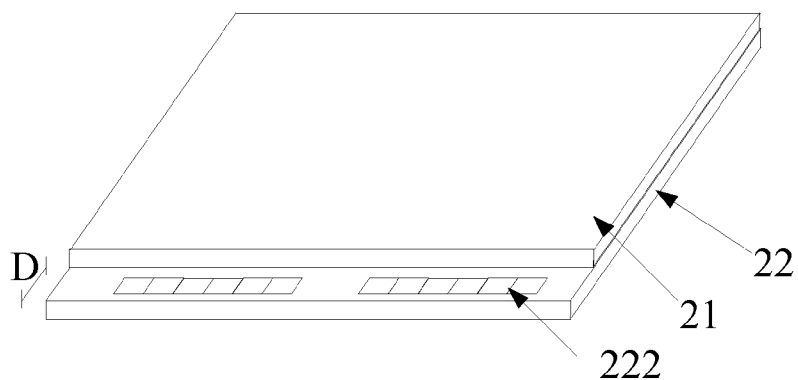

Please refer to FIGS. 2A-2C, the liquid crystal mixture is dripped on the liquid crystal coating regions 211 of the first substrate 21. When the first substrate 21 and the second substrate 22 are glued together, the second substrate 22, which is coated with the sealants and the conductive adhesive, is turned over to cover the first substrate 21 so that the sealants 221 surround the liquid crystal coating regions 211 of the first substrate 21, and further surround and seal the liquid crystal mixture in the liquid crystal coating regions 211.

Please refer to FIG. 2C, after the first substrate 21 and the second substrate 22 are glued together, the first substrate 21 is misaligned with the second substrate 22 by a predetermined distance D so as to expose the alignment voltage applying contact points 222 on the second substrate 22. When providing an electric field to the first substrate 21 and the second substrate 22, a voltage signal can be inputted directly through the exposed alignment voltage applying contact points 222 to generate the electric field. As compared to the prior art, in which the alignment voltage applying contact points 222 are exposed by scribing and breaking processes, the present method extremely simplifies the processing flow and lifts the efficiency of LCD manufacture.

In step S104, the first substrate 21 and the second substrate 22, which are glued together, are irradiated by a first UV ray, in the meanwhile, a uniform electric field is generated between the first substrate 21 and the second substrate 22.

In the particular implementation process, the first UV ray with a wavelength in a range of 300~380 nanometers (nm) is utilized to irradiate the first substrate 21 and the second substrate 22 as shown in FIG. 2C, and the irradiating time is 60~150 seconds. Preferably, the wavelength of a light center of the first UV ray is 365 nm, 352 nm or 343 nm, and the illuminance of the first UV ray is 15~120 milliwatts per square millimeter (mw/cm2). After irradiating for 60~150 seconds, the accumulated luminous flux is 15~25 joules per square millimeter (j/cm2).

Amongst, when executing irradiation of the first UV ray, the voltage signal is inputted through the alignment voltage applying contact points 222 of the second substrate 22 to generate a uniform electric field between the first substrate 21 and the second substrate 22 in coordination with the conductive adhesive of the second substrate 22. The electric field changes an arrangement of the liquid crystal molecules. Preferably, a voltage difference between the first substrate 21 and the second substrate 22 is maintained to be 2~4V as a result of the electric field provided in the present embodiment.

In the particular implementation process, a chemical change occurs in the sealants 221 of the second substrate 22 under the irradiation of the first UV ray, the sealants 221 are preliminarily solidified to glue the first substrate 21 and the second substrate 22 together.

When the liquid crystal mixture provided in the present embodiment is irradiated by the first UV ray, the liquid crystal molecules in the liquid crystal mixture do not react, however, the polymerization reaction of the liquid crystal alignment monomers in the liquid crystal mixture occurs to generate polymers, which are attached to the inner surfaces of the first substrate 21 and the second substrate 22 so as to form the lumps of the order of nanometer on the inner surfaces of the first substrate 21 and the second substrate 22 to serve as the alignment films, wherein the liquid crystal molecules form a pretilt angle under the effect of the lumps.

More specifically, small molecules of the liquid crystal monomers are polymerized to form polymers of macromolecules under the irradiation of the first UV ray. Since the polymers have a lower solubility in the liquid crystal mixture, and polymers will be separated out from the liquid crystal mixture and will be clustered on the inner surfaces of the first substrate 21 and the second substrate to form the lumps. The size of the lump is of the order of nanometer. The lumps of the order of nanometer lead to a change in an orientation of the liquid crystal molecules so as to form the pretilt angle. In the present embodiment, the formed pretilt angle is greater than 89 degree, and a pretilt angle greater than 89 degree can increase the response efficiency of the liquid crystal.

In step S105, the first substrate 21 and the second substrate 22 are irradiated by the second UV ray, in the meanwhile the first substrate 21 and the second substrate 22 are cured.

In the particular implementation process, the second UV ray provided in the present embodiment has a wavelength in a range of 300~380 nm, and the irradiating time is 1~2 hours. Preferably, the illuminance of the second UV ray is 0.05~0.10 mw/cm².

Amongst, when curing the first substrate 21 and the second substrate 22, the temperatures of the first substrate 21 and the second substrate 22 are maintained to be 110~130° C., preferably 120° C. Considering the technique of curing the substrates is a comparatively ripe technique, the detailed descriptions thereof are omitted herein.

In the present embodiment, the sealants of the second substrate 22 are completely solidified and a complete polymerization reaction of the remaining liquid crystal alignment monomers occurs to generate polymers, which are attached on the surfaces of the first substrate 21 and the second substrate 22 to form the lumps, by irradiating the second UV ray and curing at the same time. The mentioned complete polymerization reaction indicates that polymerization reaction of 99% of the liquid crystal alignment monomers is accomplished.

In the particular implementation process, the accumulated luminous flux sum of the first UV ray and the second UV ray is in a range of 20~25 joules per square millimeter (J/cm²), so it is possible to efficiently prevent the liquid crystal molecules from being damaged due to the long-time irradiation of the first UV ray and the second UV ray.

In the embodiment of the present invention, when the first substrate and the second substrate are glued together, the alignment voltage applying contact points of the second substrate are exposed. When the first substrate and the second substrate are irradiated by the first UV ray, the electric field is provided through the exposed alignment voltage applying contact points. Furthermore, according to the present invention, the first substrate and the second substrate are irradiated by the second UV ray and cured at the same time. That is, the electric field is provided during irradiation of the first UV ray, and curing is executed during irradiation of the second UV ray. The manufacture processing flow for the alignment films is extremely simplified by combing the steps, so the manufacture efficiency for the alignment films is raised. In addition, the polymerization reaction of the remaining liquid crystal alignment monomers is continuously proceeded until a complete reaction is reached, so as to ensure all the liquid crystal monomers are used for manufacturing the alignment films. Further, the present invention simplifies the process, the number of the platforms provided is decreased as compared to the prior art, and therefore the production cost of the alignment films is reduced.

In summary, the present invention has been disclosed as above by describing the preferred embodiments, modifications and equivalent alterations can be made by ordinary persons skilled in this art without departing from the spirit and scope of the present invention, and therefore the protection range of the present invention should depend on the scope defined by the claims.

What is claimed is:
1. A method for manufacturing alignment films for a liquid crystal display panel, characterized in that the method comprises steps of:
dripping liquid crystal mixture, which comprises liquid crystal molecules and liquid crystal alignment monomers, on a first substrate;
gluing the first substrate and a second substrate together so that the first substrate and the second substrate misalign with each other by a predetermined distance to expose alignment voltage applying contact points of the second substrate;
irradiating the first substrate and the second substrate by a first UV ray and providing an electric field between the first substrate and the second substrate through the alignment voltage applying contact points at the same time; polymerization reaction of the liquid crystal alignment monomers occurs under irradiation of the first UV ray and lumps are formed on inner surfaces of the first substrate and the second substrate, respectively; and
irradiating the first substrate and the second substrate by a second UV ray, and curing the first substrate and the second substrate at the same time, wherein a complete polymerization reaction of remaining liquid crystal alignment monomers occurs to form the lumps, which constitute the alignment films on the inner surfaces of the first substrate and the second substrate, the liquid crystal molecules form a pretilt angle under an effect of the lumps,
wherein a monomer molecule of the liquid crystal alignment monomers is represented by the following chemical formula:

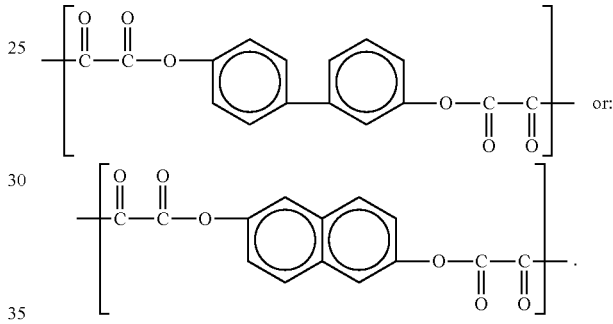

2. The method for manufacturing alignment films for the liquid crystal display panel according to claim 1, characterized in that the method further comprises the following step before gluing the first substrate and the second substrate together:
coating sealants on the second substrate;
when the first substrate and the second substrate are glued together, they are glued so that the sealants surround the liquid crystal mixture on the first substrate correspondingly.

3. The method for manufacturing alignment films for the liquid crystal display panel according to claim 1, characterized in that a proportion of the liquid crystal alignment monomers in the liquid crystal mixture is 3~5%, and a melting point of the liquid crystal alignment monomers is 100~165° C.

4. The method for manufacturing alignment films for the liquid crystal display panel according to claim 1, characterized in that a wavelength range of the first UV ray is 300~380 nm, and an illuminance of the first UV ray is 15~120 milliwatts per square millimeter.

5. The method for manufacturing alignment films for the liquid crystal display panel according to claim 1, characterized in that a wavelength range of the second UV ray is 300~380 nm, and an illuminance of the second UV ray is 0.05~0.10 milliwatt per square centimeter.

6. The method for manufacturing alignment films for the liquid crystal display panel according to claim 1, characterized in that a range of an accumulated luminous flux sum of the first UV ray and the second UV ray is 20~25 joules per square centimeter.

7. A method for manufacturing alignment films for a liquid crystal display panel, characterized in that the method comprises steps of:
dripping liquid crystal mixture, which comprises liquid crystal molecules and liquid crystal alignment monomers, on a first substrate;
gluing the first substrate and a second substrate together, irradiating the first substrate and the second substrate by a first UV ray and providing an electric field between the first substrate and the second substrate at the same time; and
irradiating the first substrate and the second substrate by a second UV ray, and curing the first substrate and the second substrate at the same time to form the alignment films on the inner surfaces of the first substrate and the second substrate, respectively,
wherein a monomer molecule of the liquid crystal alignment monomers is represented by the following chemical formula:

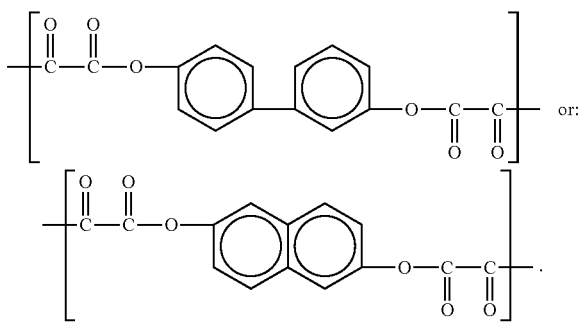

8. The method for manufacturing alignment films for the liquid crystal display panel according to claim 7, characterized in that polymerization reaction of the liquid crystal alignment monomers occurs during irradiation of the first UV ray and lumps are formed on the inner surfaces of the first substrate and the second substrate, respectively; and
a complete polymerization reaction of remaining liquid crystal alignment monomers occurs during irradiation of the second UV ray;
wherein the lumps constitute the alignment films, and the liquid crystal molecules form a pretilt angle under an effect of the lumps.

9. The method for manufacturing alignment films for the liquid crystal display panel according to claim 7, characterized in that the method further comprises the following step when the first substrate and the second substrate are glued together:
misaligning the first substrate and the second substrate by a predetermined distance to expose alignment voltage applying contact points of the second substrate.

10. The method for manufacturing alignment films for the liquid crystal display panel according to claim 9, characterized in that the electric field is provided through the alignment voltage applying contact points when providing the electric field between the first substrate and the second substrate.

11. The method for manufacturing alignment films for the liquid crystal display panel according to claim 7, characterized in that the method further comprises the following step before gluing the first substrate and the second substrate together:
coating sealants on the second substrate;
when the first substrate and the second substrate are glued together, they are glued so that the sealants surround the liquid crystal mixtures on the first substrate correspondingly.

12. The method for manufacturing alignment films for the liquid crystal display panel according to claim 7, characterized in that a proportion of the liquid crystal alignment monomers in the liquid crystal mixture is 3~5%, and a melting point of the liquid crystal alignment monomers is 100~165° C.

13. The method for manufacturing alignment films for the liquid crystal display panel according to claim 7, characterized in that a wavelength range of the first UV ray is 300~380 nm, and an illuminance of the first UV ray is 15~120 milliwatts per square millimeter.

14. The method for manufacturing alignment films for the liquid crystal display panel according to claim 7, characterized in that a wavelength range of the second UV ray is 300~380 nm, and an illuminance of the second UV ray is 0.05~0.10 milliwatt per square centimeter.

15. The method for manufacturing alignment films for the liquid crystal display panel according to claim 7, characterized in that a range of an accumulated luminous flux sum of the first UV ray and the second UV ray is 20~25 joules per square centimeter.

* * * * *